(12) United States Patent
Budgell et al.

(10) Patent No.: US 6,190,596 B1
(45) Date of Patent: Feb. 20, 2001

(54) PROCESS FOR PRODUCING CELLULOSIC SHAPED OBJECTS

(75) Inventors: Derek Budgell, Erlenbach; Ulrich Wachsmann, Elsenfeld; Wilhelm Kramer, Grosswallstadt, all of (DE)

(73) Assignee: Akzo Nobel N.V., Arnhem (NL)

( * ) Notice: Under 35 U.S.C. 154(b), the term of this patent shall be extended for 0 days.

(21) Appl. No.: 09/242,321

(22) PCT Filed: Aug. 4, 1997

(86) PCT No.: PCT/EP97/04242

§ 371 Date: Apr. 9, 1999

§ 102(e) Date: Apr. 9, 1999

(87) PCT Pub. No.: WO98/06754

PCT Pub. Date: Feb. 19, 1998

(30) Foreign Application Priority Data

Aug. 14, 1996 (DE) ............................................. 196 32 668

(51) Int. Cl.$^7$ ................................ C08B 1/00; C08L 1/02; D01F 2/02
(52) U.S. Cl. .................. 264/187; 264/211.11; 106/200.3
(58) Field of Search .................................... 264/187, 203, 264/211.11; 106/200.3

(56) References Cited

U.S. PATENT DOCUMENTS

| | | |
|---|---|---|
| 3,275,580 | 9/1966 | Battista . |
| 3,357,845 | 12/1967 | Battista . |
| 4,255,300 | 3/1981 | Franks et al. . |
| 4,426,228 | 1/1984 | Brandner et al. . |

FOREIGN PATENT DOCUMENTS

| | | |
|---|---|---|
| 553 070 A1 | 7/1993 | (EP) . |
| 648 808 A1 | 4/1995 | (EP) . |

OTHER PUBLICATIONS

Chemical Abstract, vol. 113, 1990, ref. 8230x.

*Primary Examiner*—Leo B. Tentoni
(74) *Attorney, Agent, or Firm*—Oliff & Berridge, PLC

(57) ABSTRACT

A process for producing cellulosic shaped objects includes extruding and coagulating a solution of chemical wood pulp in a tertiary amine oxide, and possibly a liquid that does not dissolve wood pulp and is miscible with the tertiary amine oxide, the solution capable of being shaped into objects, the process of producing the shapeable solution employing a first wood pulp with a higher degree of polymerization and a second wood pulp with a lower degree of polymerization, and whereby initially a solution of the first wood pulp with a higher degree of polymerization in the tertiary amine oxide and possibly non-dissolving liquid, and a composition containing the second wood pulp with a lower degree of polymerization, tertiary amine oxide, and possibly non-dissolving liquid, are prepared separately, and the solution and composition are subsequently at least mixed to obtain the shapeable solution.

22 Claims, 1 Drawing Sheet

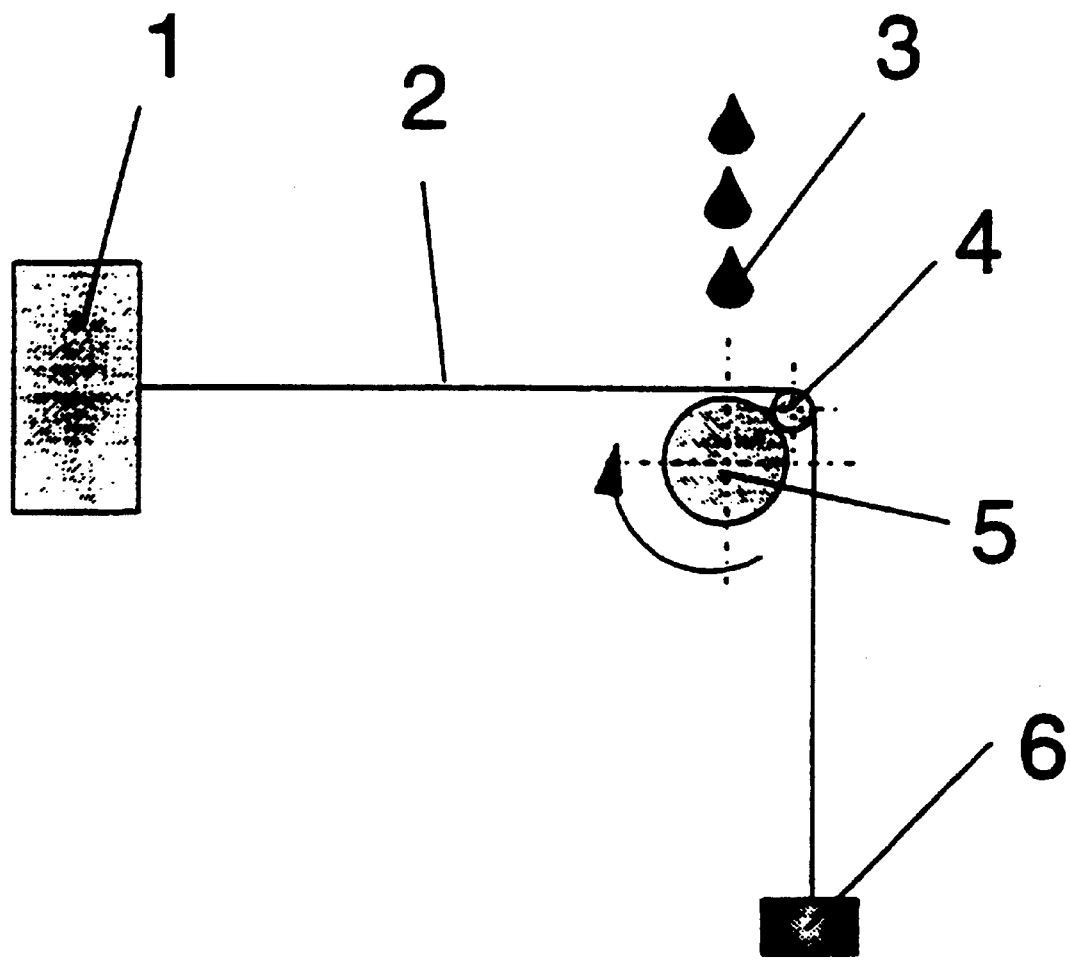
Fig.

PROCESS FOR PRODUCING CELLULOSIC SHAPED OBJECTS

BACKGROUND OF THE INVENTION

1. Field of the Invention

The invention relates to a process for producing cellulosic shaped objects by extruding and coagulating a solution of chemical wood pulp in a tertiary amine oxide, and possibly a liquid that does not dissolve wood pulp and is miscible with the tertiary amine oxide, the solution capable of being shaped into objects, the process of producing the shapeable solution employing a first wood pulp with a higher degree of polymerization and a second wood pulp with a lower degree of polymerization.

2. Description of Related Art

EP-A-0 648 808 discloses a shapeable cellulose solution made from wood pulp in the tertiary amine oxide N-methylmorpholine-N-oxide (NMMO) and a liquid that does not dissolve wood pulp and is miscible with the tertiary amine oxide, such as water. The wood pulp used is a mixture of two wood pulps, where the first wood pulp has a degree of polymerization, hereafter referred to as DP, between 500 to 2000 and the second wood pulp a DP of 90% or less of the DP of the first wood pulp and lying in the range between 350 and 900. The mixture ratio of the first wood pulp to the second is from 95:5 to 50:50 by weight.

Cellulosic shaped objects are produced from this cellulose solution, whereby the aim is high speed with a process stability that does not lead to degradation of the mechanical properties of the cellulosic shaped objects.

Solutions of wood pulp in the tertiary amine oxide NMMO are generally not anhydrous. In order to produce a shapeable solution of wood pulp in NMMO and water, the concentrations of the three-phase solution, i.e., wood pulp, NMMO, and water, must be adjusted such that each lies in a predetermined range, the so-called solution region in a ternary diagram (see for example WO094/28212).

EP-A-0 553 070 discloses tertiary amine oxides that can be used for producing shapeable and/or spinnable cellulosic solutions and that permit the production of practically anhydrous cellulose solutions. While solutions of wood pulp in NMMO with a wood pulp concentration of 12% by weight and 77.5% by weight NMMO, for example, have a water content of 10.5% by weight, a solution of cellulose in tertiary amine oxides according to EP-A-0 553 070 can be anhydrous or have a very low water content.

In the production of cellulosic solutions in NMMO and water, the procedure is normally that a pre-mixture, also termed suspension, is first produced, in which water is present to such an excess that the wood pulp is not dissolved in NMMO. Water is removed from this suspension under elevated temperature and reduced pressure, for example in an extruder, thin-film evaporator, or evacuable mixer or masticator until the solution region has been reached. This solution is then shaped into the desired objects, such as fibers, filaments, or hollow fibers, in a spinneret, or extruded to form films or membranes, and routed via an air gap into a precipitation bath for coagulating the cellulose. After coagulation, the shaped objects are washed in baths to remove NMMO and then dried.

Such a process is also used for producing the cellulose solution in accordance with EP-A-0 648 808, although production of the suspension uses not only one wood pulp but rather initially two wood pulps with differing DPs, mixed together, before they are brought into contact with NMMO and water to prepare the suspension.

The cellulose solution disclosed in EP-A-0 648 808 permits the production of cellulosic fibers at high spinning rates, and their mechanical properties such as tensile strength and elongation at break correspond to those of fibers made from a solution of only one wood pulp.

It has been shown, however, that the process employed in EP-A-0 648 808 for producing the cellulose solution, whereby wood pulps with differing DP are mixed initially, can lead to problems when wood pulps are used where one has a very high DP, such as 7000, and does not result in a cellulose solution with good shaping properties.

SUMMARY OF THE INVENTION

The object of the present invention is therefore to provide a process, as discussed initially, for producing cellulosic shaped objects, the process comprising a further production process for preparing the solution and moreover permitting the use of a wood pulp with a very high DP.

BRIEF DESCRIPTION OF THE DRAWINGS

The FIGURE shows a wet-abrasion test apparatus in accordance with the invention.

DETAILED DESCRIPTION OF PREFERRED EMBODIMENTS

This object is met for the cited process in that initially a solution of the first wood pulp with the higher degree of polymerization in the tertiary amine oxide and possibly non-dissolving liquid, and a composition containing the second wood pulp with the lower degree of polymerization, tertiary amine oxide, and possibly non-dissolving liquid, are prepared separately, and the solution and composition are subsequently at least mixed to obtain the shapeable solution.

For the composition containing the second wood pulp with lower DP, a solution of the second wood pulp in the tertiary amine oxide and possibly non-dissolving liquid can be used. NMMO is preferably used as the tertiary amine oxide, and water as the liquid that does not dissolve wood pulp and is miscible with the tertiary amine oxide. In this embodiment of the process of the invention, therefore, two solutions are prepared separately from two wood pulps with differing DPs and the solutions mixed together prior to being processed into shaped objects.

The solutions to be mixed together in this embodiment of the process of the invention can already contain the optimum water content for the respective solution before they are mixed. An embodiment is preferred, however, in which only the solution of the wood pulp with the higher DP already has the optimum water content, and the solution of the wood pulp with the lower DP has a water content chosen such that, although the wood pulp is present in dissolved form (in the ternary diagram, the solution region has already been reached), the water content only slightly exceeds the water content that is the preferred objective of the respective cellulose solution. These two solutions are mixed together, for example in a masticator, mixer, or extruder, and the water content is thereby slightly reduced until the optimum water content for the shapeable solution is attained. By mixing the two solutions under reduced pressure in order to reduce the water content, degassing of the shapeable solution is accomplished at the same time.

Alternatively, the composition containing the second wood pulp with the lower DP can be a suspension in which an excess of water is present and the wood pulp is not dissolved in the tertiary amine oxide. The mixing of the solution and the suspension can be performed, for example, in an evacuable masticator, extruder, or thin-film evaporator. In order to obtain the shapeable solution starting from the mixture of the solution and the suspension, the excess of water is removed from the mixture, under reduced pressure and elevated temperature, until the optimum water content corresponding to the total wood pulp concentration of the shapeable solution has been obtained.

The solution of the first wood pulp with the higher DP can also first be cooled and then ground and mixed in ground form with the solution or the suspension containing the second wood pulp with the lower DP.

Other solutions or suspensions of wood pulp in tertiary amine oxide can be mixed with the solution of the first wood pulp and the solution or suspension containing the second wood pulp. In order to reduce the cellulose degradation, the solution of the first wood pulp and/or the composition containing the second wood pulp can contain a stabilizer such as propyl gallate.

The DP of the first wood pulp is preferably greater than 2000, preferably greater than 5000. The second wood pulp preferably has a DP lower than 1000. It is also possible to use a mixture of wood pulps for the first wood pulp with the higher DP and/or the second wood pulp with the lower DP. When using a mixture of wood pulps, such as for the second wood pulp, their DPs and weight-based concentrations should be selected such that the resulting DP distribution has its centroid in the aforementioned range for the DP of the second wood pulp.

The overall wood pulp concentration of the shapeable solution should be 8 to 18% by weight, preferably 11 to 14% by weight. The solution of the first wood pulp with a higher DP exhibits a wood pulp concentration of 1 to 10% by weight, preferably 2 to 7% by weight. The concentration of the solution of the first wood pulp should take into consideration the magnitude of the DP of the wood pulp used to prepare the solution. For a DP of 7000, the wood pulp concentration is preferably about 3% by weight, and for a DP of the wood pulp on an order of about 2000, the wood pulp concentration is preferably about 6% by weight.

The solution of the first wood pulp and the composition containing the second wood pulp should be mixed together in a ratio such that the fraction of the first wood pulp is 2 to 20% and that of the second wood pulp is 98 to 80% of the total wood pulp concentration of the shapeable solution.

Using the process of the invention, an additional process for producing shapeable wood pulp solutions, compared to the conventional one of EP-A-0 648 808, is provided in which wood pulps with differing DPs are used. Mixing a wood pulp with a higher DP and one with a lower DP prior to preparing the suspension is relatively uncomplicated for wood pulps having a DP on the order of 350 to 2000. Trials have shown, however, that if one of the wood pulps has a very high DP, such as on the order of 7000, preparation of the solution from the wood pulps mixed in advance can cause problems. In using an evacuable masticator for preparing the solution in this case, it was not possible to obtain a shapeable solution. Starting from a mixture of wood pulps with a DP of 650 and a DP of 7000, a solution was obtained using an extruder, but it was gel-like—as optical and rheological studies showed—, and this adversely affects the suitability of the solution for spinning and the spinning stability during production of fibers and filaments.

The use of wood pulps with high DP for preparing the solution is desirable, since fibers and filaments produced therefrom normally exhibit a high tensile strength. A disadvantage, however, is that wood pulps with a high DP result in a high solution viscosity, and for this reason the wood pulp concentration must be kept low. The NMMO concentration in the solution is accordingly high. NMMO is washed out of the shaped objects in baths and then recycled for producing suspensions. The use of large amounts of NMMO therefore requires increased recovery effort and is disadvantageous with respect to conducting the process cost-effectively.

The process of the invention, however, does not permit only the use of wood pulps with a very high DP. Surprisingly, it was found that, by using it to mix the solution of wood pulp with a very high DP and the suspension or solution of the wood pulp with a lower DP, cellulosic filaments can be produced exhibiting an adequate tensile strength and, compared to filaments produced solely from the wood pulp with the lower DP, considerably higher elongation at break and reduced tendency to form fibrils. Since preferably only slight amounts of the solution of the wood pulp with a high DP are used, the process is also more cost-effective overall than one in which—as previously discussed—only one wood pulp with a high DP is used.

Wet-abrasion test apparatus

To measure the fibrillation tendency of cellulosic filaments, the wet-abrasion test apparatus shown schematically in the FIGURE is used. The wet-abrasion test apparatus consists essentially of elements denoted 1 to 6, which are explained in the following. 50 filaments are formed into a filament bundle 2 and secured in a PVC block 1. The abrasive stress is generated by guiding the filament bundle 2 over a rotating glass rod 5 with a diameter of 6 mm, to which is attached a ceramic rod 4 with a diameter of 2.5 mm. The glass rod 5 is arranged at a distance of 80 mm from the PVC block 1. The glass rod 5 and ceramic rod 4 rotate together at a speed of 25 rpm. The filament bundle 2, made taut by a weight 6 of 3 g, is kept wet by dripping water 3 on it. In the following examples, the wet-abrasion test was performed until the filament bundle 2 tears usunder, and the time was measured from the start of the test to when tearing occurred. The recorded time represents a measure of the fibrillation tendency of the filaments. The longer the time to tearing, the lower the tendency of the filaments to form fibrils.

Examples

For the following examples, a solution of a wood pulp with a higher DP in NMMO and water was first prepared. The wood pulps used were:

Z1: Linters HVE (Buckeye), DP 7000

Z2: Aliceta HD (Western), DP 2300

Z3: Viskokraft VHV (International Paper), DP 1800

The concentration of the wood pulp with the DP of 7000 (Z1) in the solution in each case was 3% by weight. NMMO was present in a concentration of 81.96% by weight, and the water content was 15% by weight. The solution contained 0.04% by weight propyl gallate as a stabilizer. The wood pulp concentration when using wood pulp Z2 (DP 2300) or Z3 (DP 1800) in the solution was 6% by weight. The NMMO concentration was 79.96% by weight and the water content was 14% by weight. These solutions as well contained 0.04% by weight propyl gallate.

In preparing the suspension or solution from the wood pulp with lower DP, the following wood pulp was used:

Z4: Viskokraft ELV (International Paper), DP 650

The DP values of all wood pulps used were determined in cupriethylenediamine using viscosimetry.

From the wood pulps with a lower DP, suspensions or solutions in NMMO and water were prepared. The wood pulp concentration in preparing the suspension or solution of the wood pulp with the lower DP was selected such that the shapeable solution obtained by mixing with the solution of wood pulp with higher DP had a total wood pulp content of 11 to 14% by weight. For example, to prepare a shapeable solution with a total wood pulp concentration of 12% by weight, 77.88% by weight NMMO, 10% by weight water, and 0.12% by weight propyl gallate, with a wood pulp fraction of which 10% comprised the 3% solution of the wood pulp with a DP of 7000 and 90% the solution of the wood pulp with a DP of 650, a solution with a wood pulp concentration of 17.1% by weight in 72.73% by weight NMMO, 10% by weight water, and 0.17% by weight propyl gallate was used as the solution of the wood pulp with the DP of 650.

The solution of the wood pulp with a high DP was mixed in ground form with a solution or a suspension of the wood pulp with a lower DP in a masticator, and excess water was removed from the mixture until a shapeable solution was obtained. Shapeable solutions prepared in this manner were each spun into a single filament at a spinning rate of 48 m/min and coagulated in a water bath. Subsequently, the individual filaments were washed and dried. Determination of the tensile strength and elongation at break was performed on individual filament. The titer of the filaments was 1.7 dtex.

In the following tables, for each of the wood pulps used—represented by their DP—the wood pulp fractions are given in percent with respect to the total wood pulp concentration C in percent by weight of the shapeable solution. Also listed are the tensile strength S in cN/tex, the elongation at break of the filaments EB in percent, and the time t in min., measured in the wet-abrasion apparatus test, until the filament bundle tears usunder.

Table 1 contains data for filaments for whose production a solution of a wood pulp with a higher DP and a suspension of a wood pulp with a lower DP were mixed together.

TABLE 1

| No. | 7000 | 2300 | 1800 | 650 | C/% by weight | S/(cN/tex) | EB/% | t/min |
|---|---|---|---|---|---|---|---|---|
| 1 | 10.0 | | | 90.0 | 13 | 39.8 | 15.1 | 24 |
| 2 | 10.0 | | | 90.0 | 12 | 36.4 | 15.4 | 23 |
| 3 | 10.0 | | | 90.0 | 11 | 34.2 | 16.1 | 27 |
| 4 | 5.0 | | | 95.0 | 12 | 35.9 | 16.0 | 25 |
| 5 | 2.5 | | | 97.5 | 12 | 36.5 | 17.1 | 20 |
| 6 | 7.9 | | | 92.1 | 11 | 33.1 | 16.2 | 24 |
| 7 | | 10.0 | | 90.0 | 13 | 36.4 | 14.6 | 21 |
| 8 | | 10.0 | | 90.0 | 12 | 35.1 | 15.4 | 25 |
| 9 | | 10.0 | | 90.0 | 11 | 33.0 | 14.3 | 28 |
| 10 | | 5.0 | | 95.0 | 12 | 32.5 | 13.0 | 24 |
| 11 | | 2.5 | | 97.5 | 12 | 37.2 | 12.9 | 20 |
| 12 | | | 10.0 | 90.0 | 12 | 38.6 | 14.0 | 22 |

Table 2 shows the data measured on filaments produced from a mixture of a solution of a wood pulp with a higher DP and a solution of a wood pulp with a lower DP.

TABLE 2

| No. | 7000 | 2300 | 1800 | 650 | C/% by weight | S/(cN/tex) | EB/% | t/min |
|---|---|---|---|---|---|---|---|---|
| 13 | 2.3 | | | 97.7 | 13 | 34.9 | 12.9 | 25 |
| 14 | 8.4 | | | 91.6 | 11 | 31.2 | 16.1 | 36 |
| 15 | 10.3 | | | 89.7 | 12 | 33.6 | 13.7 | 31 |
| 16 | 2.6 | | | 97.4 | 14 | 37.5 | 17.6 | 22 |
| 17 | 6.6 | | | 93.4 | 14 | 37.1 | 15.8 | 24 |
| 18 | 10.1 | | | 89.9 | 14 | 38.3 | 14.5 | 24 |
| 19 | 10.0 | | | 90.0 | 12 | 39.3 | 13.6 | 31 |
| 20 | 5.0 | | | 95.0 | 12 | 32.5 | 16.1 | 28 |
| 21 | 2.5 | | | 97.5 | 12 | 34.3 | 17.0 | 25 |
| 22 | | 10.0 | | 90.0 | 12 | 38.0 | 15.7 | 30 |
| 23 | | | 10.0 | 90.0 | 12 | 38.7 | 14.5 | 21 |

On the basis of the examples given in Tables 1 and 2, it is clear that filaments produced in accordance with the invention have a tensile strength between about 31 and 40 cN/tex. They are distinguished by a high elongation at break in the range of 13 to 17%, something that is especially desirable for textile applications.

Comparative examples, filaments were produced from a solution for whose production only one wood pulp was used (examples 24 to 26). Table 3 shows the textile data of the filaments produced in accordance with the comparative examples.

TABLE 3

| No. | 7000 | 2300 | 1800 | 650 | C/% by weight | S/(cN/tex) | EB/% | t/min |
|---|---|---|---|---|---|---|---|---|
| 24 | | | | 100 | 14 | 36.9 | 11.2 | 17 |
| 25 | | | | 100 | 12 | 34.0 | 11.9 | 18 |
| 26 | 100 | | | | 3 | 53.5 | 9.5 | 37 |
| 27 | | | 20 | 80 | 14 | 39.4 | 12.9 | 15 |

For examples 24 and 25, the solution was prepared from the wood pulp with a DP of 650. While the tensile strength of these filaments corresponds to that of the filaments produced according to the invention, the elongation at break is lower. In particular, the separation time determined in the wet-abrasion test for the filaments produced according to the invention is significantly higher, and their tendency to form fibrils is therefore less than that of the filaments produced according to comparative examples 24 and 25.

For comparative example 26, the solution was prepared from the wood pulp with a DP of 7000. Although the filaments produced therefrom exhibit very high tensile strength and low fibrillation tendency, they have a lower elongation at break. To obtain a shapeable solution, however, an extremely low wood pulp concentration was necessary, which made production of the filaments uneconomical, as previously discussed.

For comparative example 27, the solution was prepared from two wood pulps with differing DPs—650 and 1800. In contrast to the process of the invention, however, the wood pulps were mixed directly before bringing them into contact with NMMO and water to prepare the suspension. Filaments produced starting from this wood pulp mixture exhibit a higher elongation at break compared to the filaments given in comparative examples 24 to 26, but they tend more strongly toward fibrillation. If these two wood pulps are processed according to the invention (example14, Table 1, and example 23, Table 2), there is a resultant increase in the elongation at break as well as a reduction of fibrillation tendency.

What is claimed is:

1. A process for producing cellulosic shaped objects by extruding and coagulating a shapeable solution capable of being shaped into objects and copmrised of chemical wood pulp in a tertiary amine oxide, and optionally a liquid that does not dissolve wood pulp and is miscible with the tertiary amine oxide, the process comprising:

forming the shapeable solution from a first wood pulp with a higher degree of polymerization and a second wood pulp with a lower degree of polymerization, wherein initially a solution of the first wood pulp with a higher degree of polymerization in the tertiary amine oxide and optional non-dissolving liquid, and a composition containing the second wood pulp with the lower degree of polymerization, tertiary amine oxide, and optional non-dissolving liquid, are prepared separately, and the solution and composition are subsequently at least mixed to obtain the shapeable solution, and extruding and coagulating the shapeable solution to produce cellulosic shaped objects.

2. The process of claim 1 wherein a solution of the second wood pulp in the tertiary amine oxide and optional non-dissolving liquid is used as the composition containing the second wood pulp.

3. The process of claim 1, wherein a suspension of the second wood pulp in the tertiary amine oxide and non-dissolving liquid is used as the composition containing the second wood pulp.

4. The process of claim 1, wherein the solution of the first wood pulp and the suspension of the second wood pulp are processed to form a mixture and excess non-dissolving liquid is removed from the mixture to obtain the shapeable solution.

5. The process of claim 1, wherein the solution of the first wood pulp is cooled, ground, and mixed in ground form with the composition.

6. The process of claim 1, wherein a wood pulp with a degree of polymerization higher than 2000 is used as the first wood pulp.

7. The process of claim 6, wherein a wood pulp with a degree of polymerization higher than 5000 is used as the first wood pulp.

8. The process of claim 1, wherein a wood pulp with a degree of polymerization lower than 1000 is used as the second wood pulp.

9. The process of claim 1, wherein wood pulp mixtures are used for the first wood pulp with higher DP or the wood pulp with the lower DP.

10. The process of claim 1, wherein wood pulp mixtures are used for the first wood pulp with higher DP and the wood pulp with the lower DP.

11. The process of claim 1, wherein the solution of the first wood pulp has a concentration of 1 to 10% by weight.

12. The process of claim 11, wherein the solution of the first wood pulp has a concentration of 2 to 7% by weight.

13. The process of claim 1, wherein the shapeable solution has a total wood pulp concentration of 8 to 18% by weight.

14. The process of claim 13, wherein the shapeable solution has a total wood pulp concentration of 11 to 14% by weight.

15. The process of claim 1, wherein the solution of the first wood pulp and the composition containing the second wood pulp are mixed such that the fraction of the first wood pulp is 2 to 20% and the fraction of the second wood pulp is 98 to 80% of the total wood pulp concentration of the shapeable solution.

16. The process of claim 1, wherein additional compositions or solutions are prepared and at least mixed with the solution of the first wood pulp and the composition containing the second wood pulp to obtain the shapeable solution.

17. The process of claim 1, wherein additional compositions and solutions are prepared and at least mixed with the solution of the first wood pulp and the composition containing the second wood pulp to obtain the shapeable solution.

18. The process of claim 1, wherein N-methylmorpholine-N-oxide is used as the tertiary amine oxide.

19. The process of claim 1, wherein the liquid not dissolving the wood pulp and miscible with the tertiary amine oxide is water.

20. The process of claim 1, wherein the solution containing the first wood pulp or the composition containing the second wood pulp additionally contains a stabilizer.

21. The process of claim 1, wherein the solution containing the first wood pulp and the composition containing the second wood pulp additionally contains a stabilizer.

22. A process for producing a shapeable solution from a first wood pulp with a higher degree of polymerization and a second wood pulp with a lower degree of polymerization, the process comprising preparing a solution of the first wood pulp with the higher degree of polymerization in tertiary amine oxide and optional non-dissolving liquid, separately forming a composition containing the second wood pulp with the lower degree of polymerization, tertiary amine oxide, and optional non-dissolving liquid, and subsequently at least mixing the solution and the composition to obtain the shapeable solution.

* * * * *

UNITED STATES PATENT AND TRADEMARK OFFICE
CERTIFICATE OF CORRECTION

PATENT NO. : 6,190,596 B1  Page 1 of 1
DATED : February 20, 2001
INVENTOR(S) : Derek Budgell; Ulrich Wachsmann; and Wilhelm Kramer It is certified that error appears in the above-identified patent and that said Letters Patent is hereby corrected as shown below:

Column 2,
Line 58, after "an" insert -- evacuable --.

Column 6,
Line 23, change "Comparative" to -- As comparative --; and
Line 64, change "(example 14," to -- (example 14, --.

Column 7,
Line 4, change "copmrised" to -- comprised --.

Signed and Sealed this

Twenty-sixth Day of March, 2002

Attest:

JAMES E. ROGAN
Attesting Officer  Director of the United States Patent and Trademark Office